(12) United States Patent
Brehmer et al.

(10) Patent No.: US 7,133,074 B1
(45) Date of Patent: Nov. 7, 2006

(54) IMAGE SENSOR CIRCUITS INCLUDING SAMPLING CIRCUITS USED THEREIN FOR PERFORMING CORRELATED DOUBLE SAMPLING

(75) Inventors: Kevin E. Brehmer, Morgan Hill, CA (US); Brannon Harris, Los Gatos, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/406,979

(22) Filed: Sep. 28, 1999

(51) Int. Cl.
*H04N 3/14* (2006.01)
*H04N 5/335* (2006.01)
*H04N 5/217* (2006.01)

(52) U.S. Cl. .................. 348/308; 348/294; 348/241

(58) Field of Classification Search ................ 348/300, 348/301, 302, 303, 304, 305, 306, 307, 308, 348/294, 241, 243; 257/291, 292; 250/208.1; 327/91, 94, 95
See application file for complete search history.

(56) References Cited

U.S. PATENT DOCUMENTS

| | | | |
|---|---|---|---|
| 4,160,985 A | 7/1979 | Kamins et al. | |
| 4,734,775 A | 3/1988 | Blom | |
| 4,788,592 A | 11/1988 | Yamawaki et al. | |
| 4,965,671 A | 10/1990 | Dielhof | |
| 5,841,125 A | 11/1998 | Livingston | |
| 5,841,126 A | 11/1998 | Fossum et al. | |
| 5,859,450 A | 1/1999 | Clark et al. | |
| 5,861,645 A | 1/1999 | Kudo et al. | |
| 5,892,540 A * | 4/1999 | Kozlowski et al. | 348/300 |
| 5,926,214 A | 7/1999 | Denyer et al. | |
| 5,933,188 A | 8/1999 | Shinohara et al. | |
| 5,981,932 A | 11/1999 | Guerrieri et al. | |
| 6,072,206 A | 6/2000 | Yamashita et al. | |
| 6,084,229 A * | 7/2000 | Pace et al. | 250/208.1 |
| 6,090,639 A | 7/2000 | Pan | |
| 6,137,535 A * | 10/2000 | Meyers | 348/340 |
| 6,144,408 A * | 11/2000 | MacLean | 348/241 |
| 6,271,554 B1 | 8/2001 | Nozaki et al. | |
| 6,307,195 B1 | 10/2001 | Guidash | |
| 6,311,895 B1 | 11/2001 | Olmstead | |
| 6,317,154 B1 | 11/2001 | Beiley | |

(Continued)

FOREIGN PATENT DOCUMENTS

GB 2160060 A 12/1985

OTHER PUBLICATIONS

Masakazu Aoki et al. (Feb. 13, 1980) Advances in CCD and Imaging.

(Continued)

*Primary Examiner*—Vivek Srivastava
*Assistant Examiner*—Justin Misleh
(74) *Attorney, Agent, or Firm*—Lowrie, Lando & Anastasi, LLP (57) ABSTRACT

A CMOS image sensor circuit includes an array of sensing elements which integrate electrical charge according to the light intensity thereon. In order to measure the accumulated charge voltage at the individual sensing elements, and thus obtain the image data from the array, a sampling circuit is provided. The sampling circuit operates using a high-gain amplification stage and an auto-zero amplifier to perform correlated double sampling, which enables non-linear influences which may arise in the array to be reduced in the measuring process. The sampling circuit can also include a sample and hold circuit arranged to account for a feed-through effect arising from pre-charge circuitry in the sensing elements. The sample and hold circuit can be included within the feed-back loop of the high-gain amplification stage for further increases in linear performance.

21 Claims, 8 Drawing Sheets

U.S. PATENT DOCUMENTS

| | | | |
|---|---|---|---|
| 6,421,085 B1* | 7/2002 | Xu | 348/308 |
| 6,429,898 B1 | 8/2002 | Shoda et al. | |
| 6,438,276 B1* | 8/2002 | Dhuse et al. | 382/312 |
| 6,465,862 B1 | 10/2002 | Harris | |
| 6,532,040 B1* | 3/2003 | Kozlowski et al. | 348/241 |
| 6,570,617 B1* | 5/2003 | Fossum et al. | 348/308 |
| 6,633,029 B1* | 10/2003 | Zarnowski et al. | 250/214 R |
| 6,753,912 B1* | 6/2004 | Wayne | 348/241 |

OTHER PUBLICATIONS

Shinya Ohba et al. (1995 IEEE) Vertical Smear Noise Model for an MOS-Type Color Imager.

D. Renshaw et al. (1990 IEEE) Asic Vision.

John E. Tanner (SPIE vol. 1155 1989) A High-speed Video Camera and Recorder.

D Renshaw et al. ( 1990 IEEE) Asic Image Sensors.

P.B. Denyer et al. (1993 IEEE) CMOS Image Sensors for Multimedia Applications.

Orly Yadid-Pecht et al. (1991 IEEE) A random Access Photodiode Array for Intelligent Image Capture.

Fumihiko Andoh ( ISSCC 1990) Image Sensors, Processors, and Displays.

Peter J.W. Noble (1968 IEEE) Self-Scanned Silicon Image Detector Arrays.

Chamberlain, S.G., "Photosensitivity and Scanning of Silicon Image Detector Arrays," IEEE Journal of Solid-State Circuits, Dec. 1969, pp. 333-342.

Ohba, Shinya, et al, "MOS Area Sensor: Part II-Low Noise MOS Area Sensor with Antiblooming Photodiodes," IEEE Transactions on Electron Devices, vol. Ed 27, No. 8, Aug. 1980, pp. 1682-1687.

* cited by examiner

Figure 1

(Prior Art)

Figure 2

(Prior Art)

Figure 3

(Prior Art)

IMAGE SENSOR CIRCUITS INCLUDING SAMPLING CIRCUITS USED THEREIN FOR PERFORMING CORRELATED DOUBLE SAMPLING

FIELD OF THE INVENTION

The present invention relates to the field of image sensor circuits. In particular, the present invention relates to a method and apparatus for sampling pixel signal levels in a CMOS image sensor.

BACKGROUND OF THE INVENTION

Semiconductor image sensing devices are finding widespread application with the increased use of digital still cameras and digital video cameras. Charge coupled device (CCD) technology has hitherto dominated the market for such imagers. The present CCD imagers have a number of good features including high image quality and low noise characteristics; however, there are also several limitations which are inherent to CCD's. The specialized process utilized to produce CCD imagers is not well suited to forming driving and processing circuitry used in conjunction with the CCD image sensing array. Thus, it is necessary to implement those functions on secondary integrated circuit chips, which increases the complexity and cost of the CCD imaging system. The sensitive clocking requirements of CCD's adds further complexity and results in relatively high power consumption for CCD imaging systems.

An alternative to CCD imaging which is gaining popularity involves forming image sensors using complementary metal-oxide silicon (CMOS) processing. CMOS image sensors are advantageous in that the CMOS process allows for the inclusion of circuits for image processing and the like, allowing a high level of product integration to enable virtually all electronic camera functions to be integrated on a single chip. Image sensors manufactured in CMOS can also be made relatively inexpensively and facilitate significant power savings compared to CCD sensors. These are particularly important issues for portable consumer applications.

There have been some difficulties with CMOS image sensors relating to the image quality that can be obtained, and one source of the quality difficulties arises from the way in which pixel signal values are sampled in the imaging circuit. One form of CMOS image sensing involves precharging a circuit node with a reference voltage, exposing the node to image forming light to allow charge to leak from the node through light-induced leakage current for a predetermined period, and measuring the difference in voltage level at the node caused by the light exposure. The image sensing therefore requires sampling of the node voltage before and after exposure to light to determine the voltage level difference. Known sampling circuits to accomplish that end have some drawbacks arising from non-linearity in the sampling circuitry and limitations of the CMOS components which can result in, for example, fixed pattern noise (FPN).

SUMMARY OF THE INVENTION

In accordance with the principles of the present invention, there is provided a sampling circuit for an image sensing circuit having a photosensitive element which develops a photo sensing node voltage according to incident light. The sampling circuit has an amplifier circuit to which the photo sensing node voltage is input. A sample and hold circuit is coupled to receive an output of the amplifier circuit, and a clamping circuit coupled to receive an output of the sample and hold circuit and produce an output signal representing a double correlated sample voltage difference at said photo sensing node.

The image sensing circuit preferably includes a plurality of pixels each having a photo sensing node and arranged in a two dimensional array. The clamping circuit may be an auto-zero differential input amplifier which can be set to have a starting baseline of a known voltage level. The clamping circuit and sample and hold circuit control signals can be controlled so that the output of the clamping circuit changes in accordance with the voltage at the photo sensing node from the known baseline voltage level until the sample and hold circuit is switched to hold. By manipulating the sample and hold and clamping control signals the output of the clamping circuit can be controlled to represent only the change in voltage at the photo sensing node which results during exposure to light.

In accordance with the present invention, there is also provided a method for obtaining an output signal from a light sensing circuit wherein operation of the light sensing circuit includes a reset phase during which a photo sensing node of the light sensing circuit is charged to a reference voltage and an integration phase during which voltage at the photo sensing node is modified by a photocurrent according to incident light intensity, the method comprising: correlated double sampling of the photo sensing node voltage to obtain an output signal representative of a change in voltage at the photo sensing node over the time of said integration phase; and holding said output signal for processing; wherein the correlated double sampling comprises differencing the photo sensing node voltage from a first time instant occurring after completion of a said integration phase and before instigation of a subsequent said reset phase, to a second time instant occurring after completion of said subsequent reset phase.

The present invention also provides an image sensor circuit having a two dimensional array of light sensitive pixel circuits, each pixel circuit comprising a photosensitive element and a reset switching element coupled to a light sensing node, a differential input transistor pair having a first input thereof coupled to said light sensing node, and an enable switching element coupled to selectively block output from the differential input transistor pair, the image sensing circuit further comprising sampling circuitry for producing output signals corresponding to light incident on each of the respective pixel circuits.

The present invention also provides a sampling circuit for an image sensing circuit having a photosensitive element which develops a photo sensing node voltage according to incident light, the sampling circuit comprising: a feedback loop amplifier circuit having said photo sensing node voltage as input; and a clamping circuit coupled to receive an output from the feedback loop amplifier circuit and produce an output signal representing a double correlated sample voltage difference at said photo sensing node.

In the context of an image sensor circuit having an array of pixels including light sensing nodes at each of which a change in voltage can be imparted by exposure to a light source, the present invention further provides a method for obtaining output signals representing the voltage changes at the light sensing nodes in order to obtain image data, comprising: at each said pixel providing an amplifier circuit with an input driven by the voltage on the respective light sensing node to produce an amplifier output; providing a sample and hold circuit coupled to selectively receive the amplifier output of a said pixel amplifier circuit in the array, the sample and hold circuit being controlled by a SAMP control signal input and producing an output signal; providing a clamping circuit coupled to receive the sample and hold circuit output, the clamping circuit producing an output according to the received sample and hold signal input and a control signal CLAMP; and controlling the SAMP and CLAMP control signals to the sample and hold circuit and the clamping circuit respectively so as to perform correlated double sampling of the voltage at the respective light sensing node so as to obtain a representation of the change of voltage thereat imparted substantially only by exposure to light.

BRIEF DESCRIPTION OF THE DRAWINGS

The invention is described in greater detail hereinafter, by way of example only, through description of a preferred embodiments thereof and with reference to the accompanying drawings in which.

DETAILED DESCRIPTION OF THE PREFERRED EMBODIMENT

A method and apparatus for sampling pixel signal levels in a CMOS image sensor circuit is disclosed herein. In the following description, for purposes of explanation, specific nomenclature and specific implementation details are set forth to provide a thorough understanding of the present invention. However, it will be apparent to one skilled in the art that these specific details are not required in order to practice the present invention. For example, the present invention has been described with reference to N-Well process technologies. However, the same teachings can easily be applied to other types of process technologies.

A CMOS Image Sensor Array

Figure 1:
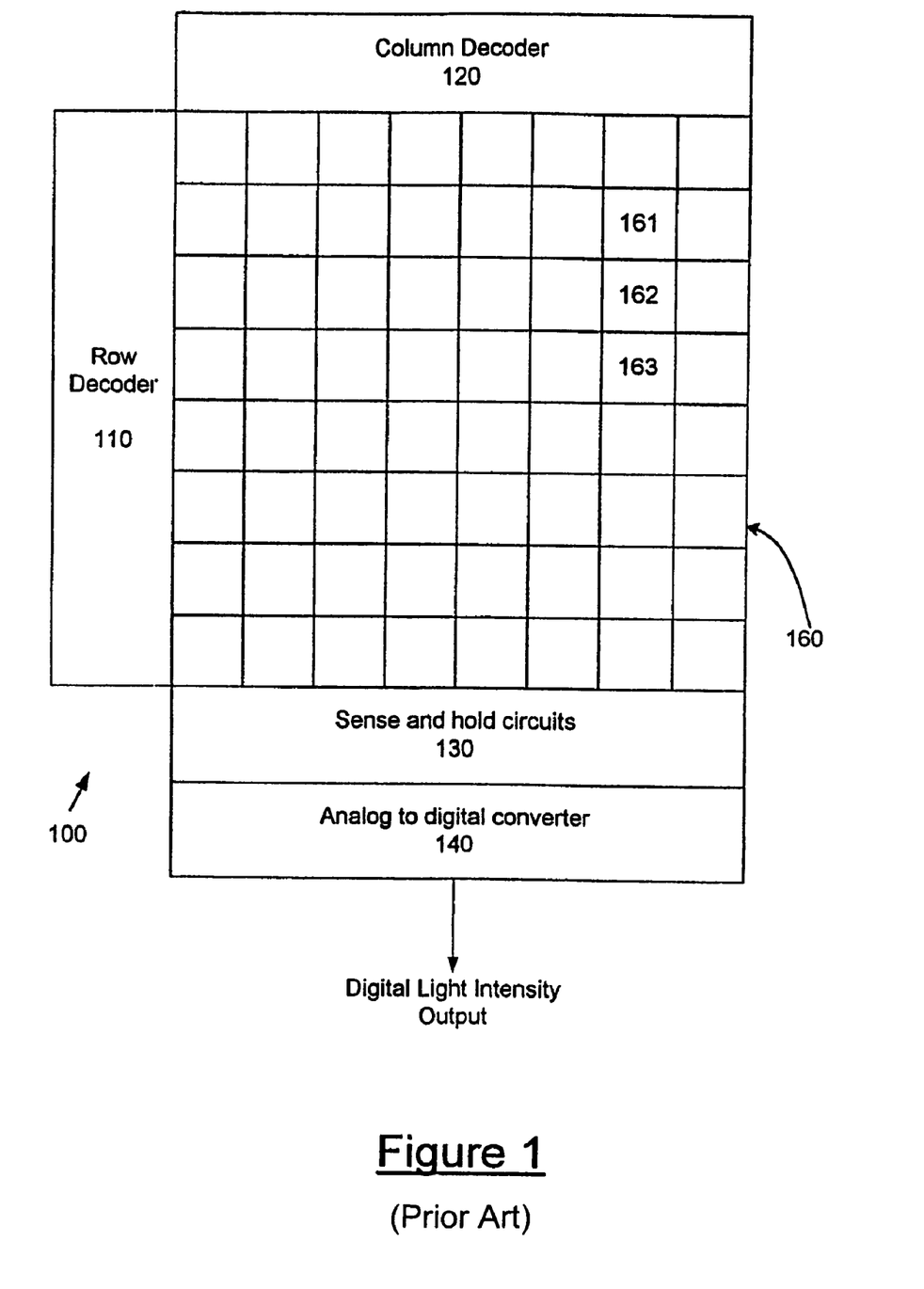
FIG. 1 is a block diagram of an image sensing array.

FIG. 1 is a block diagram of a circuit 100 having a typical two-dimensional CMOS image sensor array 160. Each element in the array 160 (such as array elements 161, 162, and 163) is an individual CMOS image sensor circuit. The individual CMOS image sensor circuits are also known as pixel circuits.

The CMOS image sensor array 160 is controlled by row decoder 110 and a column decoder 120. The row decoder 110 and column decoder 120 are operative to select a particular pixel circuit to be activated. The output of an activated CMOS image sensor circuit is carried down a column output line to a sense and hold circuitry 130. Each pixel column is provided with a separate sense and hold circuit, so that each of the sense and hold circuits 130 senses the output voltage value of an activated CMOS image sensor circuit in a respective column. Finally, the sensed voltage value from a sense and hold circuit is converted into a digital value by an analog to digital converter 140.

A CMOS image sensor array is similar to a Dynamic Random Access Memory (DRAM) array except that instead of individual memory cells that are set and later tested, a CMOS image sensor array has individual CMOS image sensor circuits that are set to an initial voltage value and then sampled after light exposure. Furthermore, a CMOS image sensor array differs from a DRAM array in that the output voltage is quantized by an analog to digital converter. This means that the output of a CMOS pixel circuit is an analog voltage which is used to determine a digital value of several bits in length (depending upon color/grayscale resolution) rather than the single bit represented by a DRAM cell. Accordingly, it is important that the analog values output from the CMOS image sensor pixel circuits be obtained and processed carefully to ensure consistency of performance over the entire array and over time. For example, it is desirable that any two pixel cells in the array return to the A/D converter as close to the same analog voltage value as possible if exposed to the same light conditions, despite any limitations placed on the image sensing circuit by the characteristics of the circuit elements, materials or processes. In order to achieve that aim, the performance of the sense and hold circuitry 130, also referred to as a sampling circuit, is crucial because it is responsible for measuring the output of the pixel circuit and transferring the result to the analog to digital converter.

A CMOS Image Sensor Pixel

Figure 2:
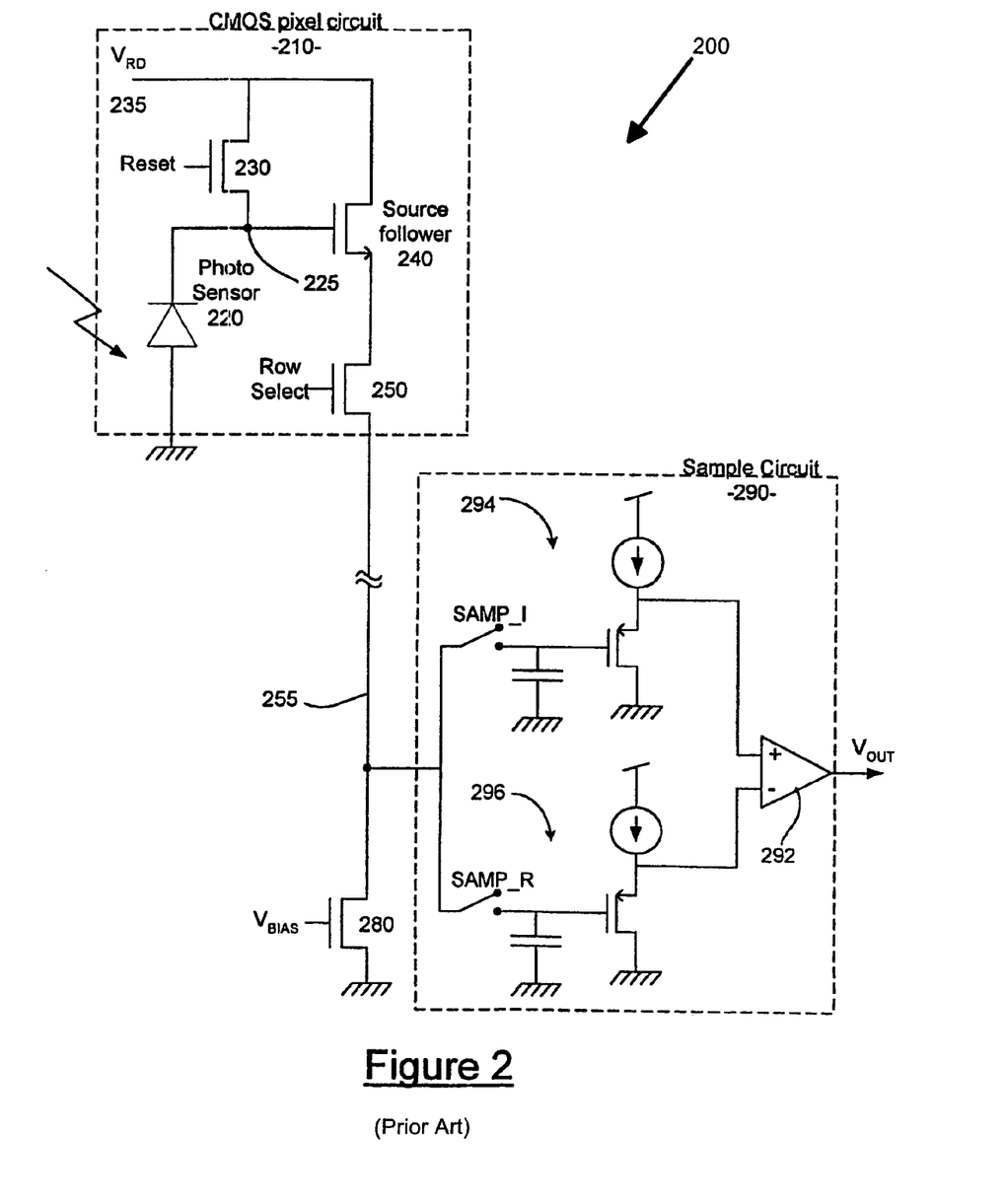
FIG. 2 is a circuit diagram of a prior art CMOS image sensor pixel circuit and sampling circuitry.

FIG. 2 illustrates a circuit 200 which includes an individual CMOS image sensor pixel circuit 210. The CMOS image sensor pixel circuit has a reset transistor 230 connected between a supply voltage line 235 and a photo sensing node 225, and a photo sensor element (photo-diode) 220 coupled between the node 225 and ground potential. The photo sensing node 225 is also connected to the gate of a source follower transistor 240. The source of transistor 240 is in turn coupled to a column output line 255 by way of a row select pass transistor 250. The reset transistor 230 is controlled by a RESET signal, whilst the row select transistor 250 is controlled by a ROW SELECT signal. Further, leakage current through the photo sensor element 220 is affected by the intensity of light which is incident thereon and which, in practice, may be controlled by a shutter arrangement or the like.

As also illustrated in FIG. 2, the column output line 255 provides the output of the CMOS image sensor circuit 210 to output processing circuitry, which in this case comprises a current source transistor 280 controlled by a bias voltage ($V_{BIAS}$) and a sample circuit 290. The sample circuit 290 as shown utilizes a differential amplifier 292 which produces an output $V_{OUT}$ representing a measure of the voltage change at the photo sensing node 225 during light exposure. The inputs to the differential amplifier 292 are provided by first and second voltage holding circuits 294 (positive input) and 296 (negative input). The first voltage holding circuit is controlled by a control signal SAMP_I, and the second voltage holding circuit is controlled by signal SAMP_R.

The CMOS image sensor circuit 210 operates in three principal phases: reset, integration, and read-out. These operational phases of the CMOS image sensor circuit are described briefly hereinbelow with reference to FIG. 3 which displays the voltage at the photo sensing node 225 (i.e. at the gate of source follower transistor 240) of the CMOS image sensor circuit 210 during the operation of the CMOS image sensor circuit.

Figure 3:
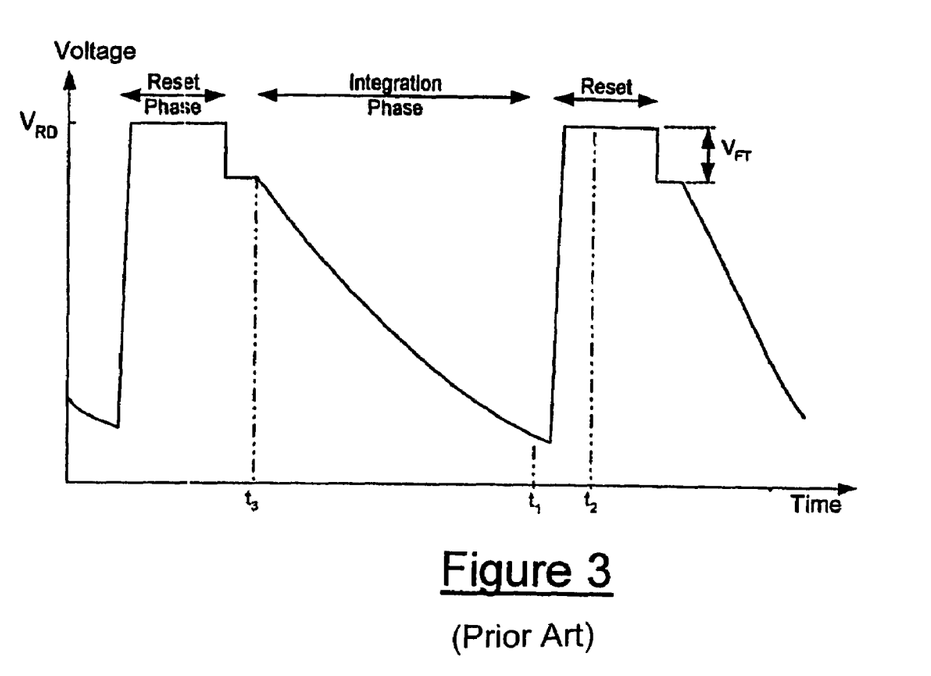
FIG. 3 is a voltage graph diagram relating to operation of the circuit of FIG. 2.

Beginning with the Reset Phase indicated in FIG. 3, the photo sensing node 225 is charged by reset transistor 230 to a reset voltage level using voltage source $V_{RD}$. However, the actual voltage level achieved at the node 225 at the completion of the Reset Phase is in fact $V_{RD}$ minus the feed through effect voltage of the reset transistor 230, $V_{FT}$. The resulting charged voltage level is referred to as the "reference black" voltage level ($V_{RB}=V_{RD}-V_{FR}$). This phase of the operation can also be referred to as a "pre-charge" stage.

The drain voltage $V_{RD}$ supplied to the MOSFETs 230 and 240 is in this case less than the voltage $V_{DD}$ used for the RESET on 230. If the drain voltage at 235 were $V_{DD}$ and 230 is an nMOS device, then the voltage at node 225 reaches ($V_{DD}-V_T$) with RESET=$V_{DD}$. When RESET goes to GROUND potential the voltage at node 225 is then ($V_{DD}-V_T-V_{FT}$). $V_T$ is the nMOS threshold voltage of 230 and $V_{FT}$ is the feed through voltage that results on node 225 when 230 is switched from "on" to "off". This type of reset operation can be referred to as a "sub threshold reset" because at the time RESET goes from $V_{DD}$ to GROUND, 230 is biased with a gate-source voltage, $V_{GS}$, that is at or below $V_T$. Sub threshold reset results in a much lower feed through effect because there is no charge in the channel of 230 when it is biased in sub threshold. The feed through effect in this case is caused only by parasitic capacitive coupling of the RESET signal to node 225. However, sub threshold reset has other problems resulting from the slow settling time at the photo sensing node when $V_{GS}$ of 230 goes below $V_T$.

To avoid the problems associated with sub threshold reset the reference voltage $V_{RD}$ is used at 235, where $V_{RD}$ is slightly less than ($V_{DD}-V_T$). This ensures that when the gate of 230 is pulled to $V_{DD}$, node 225 goes to exactly $V_{RD}$. In this case there is no $V_T$ loss in the reset mechanism. This can be referred to as a "hard reset". Using hard reset, when the gate is at $V_{DD}$, transistor 230 is biased in the ohmic or linear regime; therefore, it has high conductance with respect to the sub threshold biased state and the settling time problems are avoided. However, hard reset increases the feed through effect because the channel of 230 is inverted with negative charge. The majority of this charge gets injected into the source (the photo sensing node) terminal when the device is turned off. The feed through effect for hard reset is much greater than for sub threshold reset; therefore, for the same relative mismatch in $V_{FT}$ for an array of pixels, the hard reset mode has more FPN.

Following the Reset Phase the pixel circuit 210 is exposed to image forming light (e.g. through a structure of lenses and the like) during an Integration Phase indicated in FIG. 3. The photons that strike the photo sensor element 220 during the Integration Phase causes charge to leak through the photo sensor 220 from the charged node 225 to ground. The voltage level of the remaining charge on the photo sensor 220 is related to the number of photons that strike the photo sensor in such a way that the greater the intensity of light incident on the photo sensor, the more rapid the voltage drop which will occur at the node 225 during the integration phase due to light induced current leakage through the photo sensor 220. This leakage current is integrated on the parasitic capacitance at node 225 resulting in a rate of change in voltage at 225 proportional to the leakage current. Thus, during the integration phase the voltage level at the gate of the source follower 240 will drop. A white level, is reached as the photo sensor approaches the negative power supply potential (ground). A black level occurs, when no photons are integrated such that the photo sensor voltage essentially remains at the original reference black voltage level ($V_{RB}=V_{DD}-V_T$).

In order to obtain an output from the pixel circuit, the row select transistor 250 is activated to enable the source voltage level of the source follower transistor 240 to be measured using sample circuit 290. It is possible to accomplish that measurement in a number of different ways. One method that can be used for measurement of the photo sensor voltage involves a Correlated Double Sampling (CDS) circuit. A Correlated Double Sampling circuit operates by sampling the signal level to be measured at two different instants of time, in this case to determine the voltage level at the photo sensing node before and after light integration. However, timing considerations make it more convenient to in fact sample the photo sensing node voltage at the end of the integration phase of one cycle and before light integration of the next cycle. Therefore, the integrated photo sensor voltage signal is sampled first. Then the CMOS image sensor circuit is reset for the next sensing cycle and the reset voltage is sampled for a reference black value. The desired signal is the difference between the integrated signal voltage and the photo sensor reset voltage.

The sample circuit 290 shown in FIG. 2 is a CDS circuit which is controlled by the two control signals SAMP_I and SAMP_R. In operation, the SAMP_I signal is turned "on" and then "off" at the end of light integration to obtain an integration voltage sample $V_I$, and the SAMP_R signal is turned on and off following reset to obtain a reset voltage sample $V_R$. The output voltage then represents a measure of the change in voltage at the photo sensing node during light integration: $V_{OUT}=V_I-V_R$.

As discussed hereinabove, the existing CMOS image sensor circuits have several known problems. One problem with existing CMOS image sensors is that slight differences between the transistors in the different CMOS image sensor pixels can cause fixed pattern noise in captured images. For example, transistor threshold voltage ($V_T$) differences between adjacent pixels will cause different voltage levels at the source of source follower (240 in FIG. 2) for the same gate voltage, thereby creating fixed pattern noise within the CMOS image sensor.

One difficulty caused by variations in threshold voltage is manifested in non-linear performance of the source follower transistor (240). The threshold voltage ($V_T$) is made up of two parts: a zero bias term and a bias point dependent term. The zero bias term is, in part, process dependent. For example, the zero bias term is affected by the surface implant dose under the channel of the transistor. The voltage dependent term or body effect term, is a function of the back bias voltage between the source and body of the source follower transistor. As a result, the source follower transistor within each pixel circuit exhibits a linearity error, as the voltage on the photo sensor changes from the reset voltage to ground potential. Typically, the source follower transistor should have unity gain. However, body effect on the source follower and row select transistors will result in a changing gain level. Specifically, the gain of the source follower transistor will vary as the photo sensor voltage varies. This nonlinear gain behavior is an undesirable effect for a high performance image sensor.

Another way in which threshold voltage variations result in undesirable performance characteristics of the image sensing circuit arises from the feed through effect of the reset transistor 230. Referring to FIG. 3, the read-out phase of the image sensing circuit (using CDS) involves obtaining the voltage difference at the photo sensing node 225 at time instants $t_1$ (following light integration) and $t_2$ (during the reset condition). However the actual change in node potential brought about by the influences of light exposure would be obtained by measurements taken at time instants indicated at $t_3$ and $t_1$ shown in FIG. 3. Thus the desired signal and the CDS measured signal differ by the feed through voltage of the reset transistor 230. Differences in threshold and feed through voltage characteristics of reset transistors as between different pixel circuits can therefore also cause undesirable fixed pattern noise in the image sensing array.

CMOS Image Pixel Circuit Signal Sampling

Figure 4:
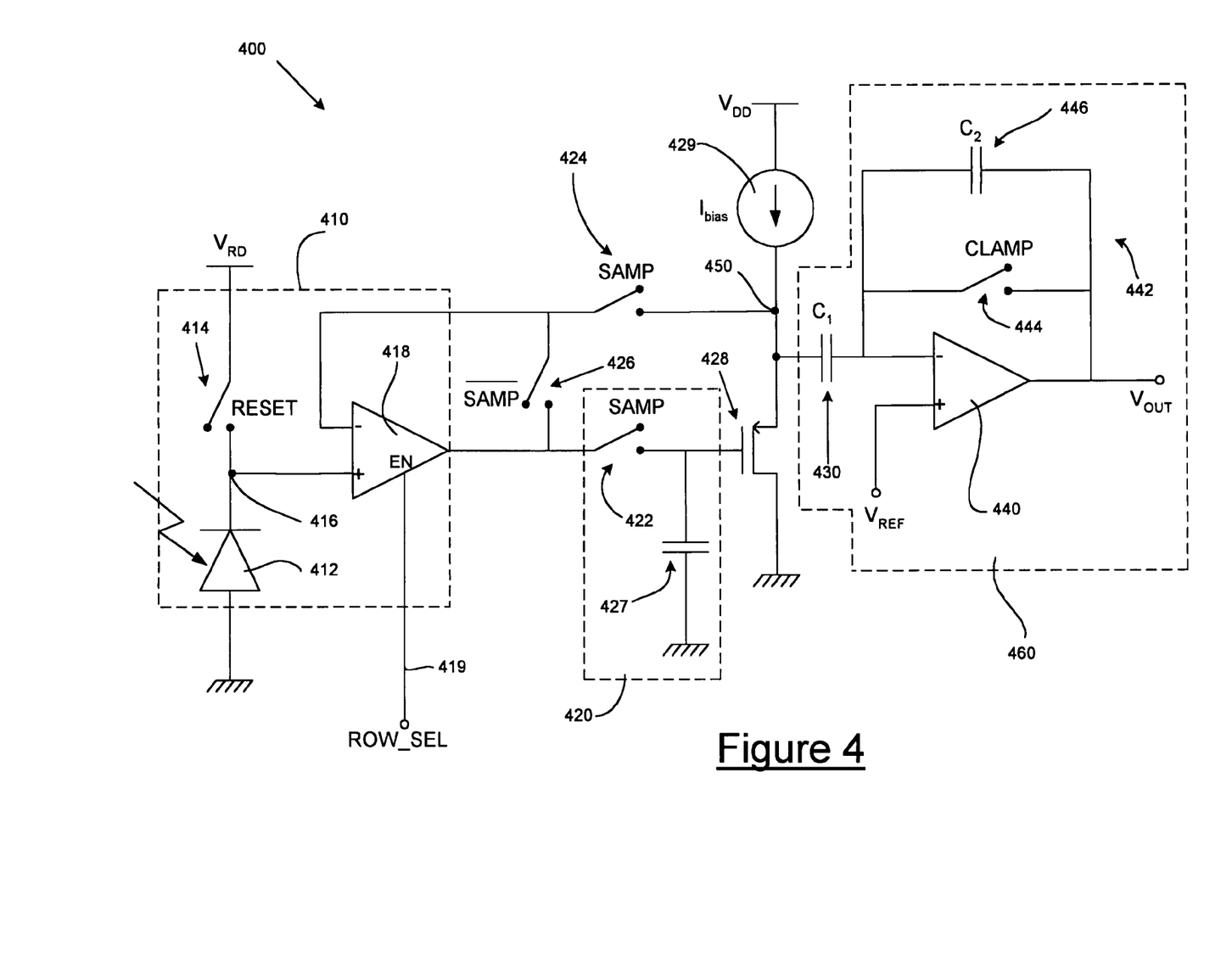
FIG. 4 is a functional circuit diagram of a preferred embodiment of the present invention.

A preferred circuit structure of a CMOS pixel circuit and a sampling circuit therefor constructed according to the principles of the present invention is shown in functional form in FIG. 4. The circuit 400 as shown in FIG. 4 includes a pixel circuit 410 which would typically be an element in a two-dimensional pixel array as described above. The remainder of the circuit 400 is sensing and sampling circuitry which can be located at the bottom of a column of pixel elements in the array, to be shared by the pixel circuits in the column, although only a single pixel circuit is shown in the circuit 400. The particular pixel element in the column which is operatively coupled to the sampling circuitry is governed by control signals ROW_SEL on a line labeled 419.

As in the case of the prior art pixel circuit described above, the pixel circuit 400 of the preferred embodiment has a reset switching element 414 connected between a voltage supply ($V_{RD}$) and a photo sensing node 416, and a photo sensor element 412 coupled between the node 416 and ground potential. The photo sensor element 412 may be a conventional photo diode as shown, a photo gate circuit, or any other circuit that translates light into a detectable voltage value. The photo sensing node 416 is also coupled to the positive input of a feedback amplifier circuit 418. The amplifier circuit 418 is latched by the aforementioned ROW_SEL control signals provided on the control line 419 which is coupled to the Enable input (EN) of the amplifier circuit. Therefore, the amplifier circuit 418 does not substantially affect and is not affected by the charge on the photo sensing node 416 until the particular pixel cell row is selected when a ROW_SEL enable signal is supplied to the amplifier on line 419.

As will become apparent from the description presented further hereinbelow (particularly with reference to FIG. 6), not all of the circuit components which make up amplifier circuit 418 are physically located in the pixel circuits of the pixel array in a typical application. In order to minimize the number of elements in the pixel circuit, and therefore make the resolution of the pixel array better for a given size, as much as possible of the amplifier circuit is contained in circuitry that can be located at the bottom of a pixel array column and shared by the pixel circuits in that column.

The circuit 400 of FIG. 4 further includes a sample and hold circuit 420 which is coupled to the amplifier circuit 418. The sample and hold circuit 420 is in fact coupled within the feedback loop of the amplifier circuit 418. The sample and hold circuit is controlled by an input signal SAMP, which drives switching elements 422, 424 and 426.

Switching element 422 is connected at one side to the output of the amplifier circuit 418, and at the other side to a node at the gate of a pMOS source follower transistor 428. Coupled between the gate node of the transistor 428 and ground potential is a charge storage element (e.g. capacitor) 427, which performs the "hold" function of the sample and hold circuit 420. At the source of the source follower transistor is an output node 450 to which is also coupled a current source 429 supplying current from a voltage supply $V_{DD}$.

The aforementioned switching element 424 is connected between the output node 450 and the negative input (feedback) terminal of the amplifier circuit 418. The switching element 424 is constructed so as to be switched "on" by the control signal SAMP. The switching element 426, on the other hand, is constructed to be switched "off" by the control signal SAMP, and is coupled directly across the output and negative input terminals of the amplifier circuit 418.

The feedback loop controlled by the SAMP signal determines the gain $V_{450}/V_{416}$ (i.e. the ratio of voltages at nodes 450 and 416). This is the "closed loop" gain and is ideally unity with SAMP "on". Various gain values can be employed for the amplifier 418 in accordance with the present invention, however a high gain value is preferable is this instance. A relatively high gain for the amplifier circuit 418 is advantageous because the source follower transistor 428 is coupled within the feedback loop. Accordingly, as will be recognized by those skilled in the art, non-linear effects of the source follower discussed above can be reduced by increased gain of the amplifier 418, providing a beneficial performance enhancement of the pixel sampling circuit.

The circuit 400 shown in FIG. 4 further comprises an auto-zero clamping circuit 460 coupled to the output node 450. The auto-zero clamping circuit 460 provides some benefits as compared to the sample circuit 290 employed in the prior art described hereinabove and illustrated in FIG. 2. As shown in FIG. 4, in the preferred implementation of the present invention, the clamping circuit 460 includes an auto-zero amplifier circuit 440 having its positive input terminal coupled to a reference voltage $V_{REF}$. The negative input terminal of the amplifier circuit 440 is coupled to the output node 450 by way of a charge storage element in the form of capacitor 430 (also labeled as capacitor $C_1$). The output of the clamping circuit 460 ($V_{OUT}$) is provided at the output of the amplifier circuit 440, and may in practice be coupled to provide input to a digital to analog converter or the like (refer to FIG. 1).

The clamping circuit 460 includes a feed back loop 442 connecting the output to the negative input terminal of the amplifier 440. The feedback loop comprises a switching element 444 connected in parallel with a charge storage element 446 (also labeled as $C_2$). The state of switching element 444 is governed by a control signal CLAMP.

Figure 5:
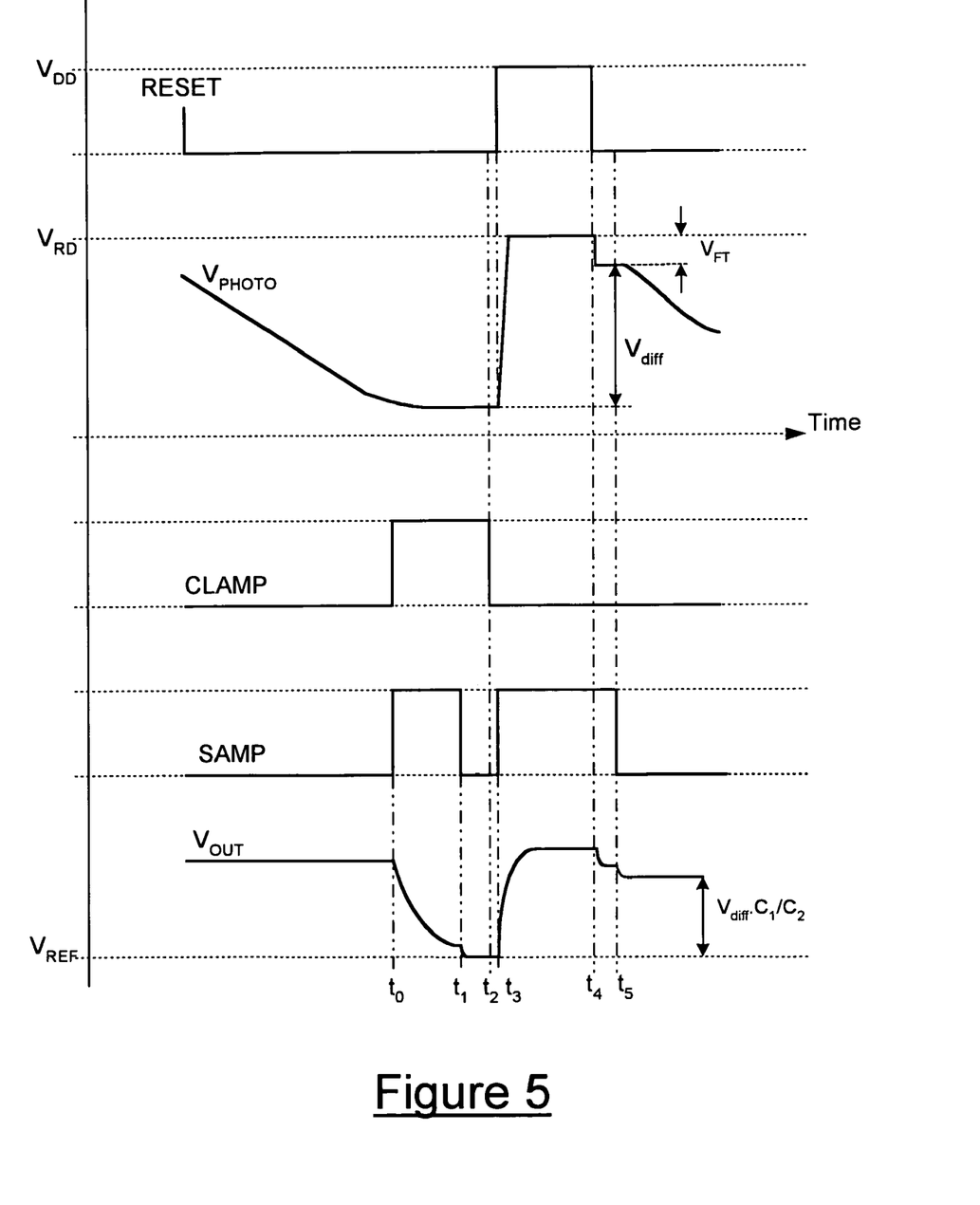
FIG. 5 is waveform timing diagram relating to operation of the circuit of FIG. 4.

The operation of the functional circuit represented in FIG. 4 is described hereinbelow, having reference where appropriate to voltage waveform diagrams shown in FIG. 5. By way of preliminary explanation, it can be seen that there are five voltage waveform plots shown in FIG. 5, labeled RESET, $V_{PHOTO}$, SAMP, CLAMP and $V_{OUT}$. As will be readily apparent, the waveforms RESET, SAMP and CLAMP represent input control signals to the circuit 400 as described above, controlling the reset transistor 414, sample and hold circuit 420 and clamping circuit 460, respectively. These control signals may be supplied, in a practical implementation of the present invention, by control circuitry (not shown in the drawings) integrated on the same chip as the image sensing array and sampling circuitry, or from an external source if desired. The waveform labeled $V_{PHOTO}$ in FIG. 5 represents the voltage at the photo sensing node 416 of the pixel circuit. The waveform labeled $V_{OUT}$ represents the voltage at the output of the clamping circuit 460.

Because the light sensitive portion of the circuit 400 is essentially the same as the prior art shown in FIG. 2, the voltage waveform $V_{PHOTO}$ also resembles that shown in FIG. 3 and described above. The reset phase of the $V_{PHOTO}$ waveform is initiated by a high level pulse signal on the RESET control line, as shown in the corresponding RESET waveform. This action pre-charges the photo sensing node 416 (FIG. 4) to the voltage supply level $V_{RD}$. Following the RESET signal pulse, the gate of the switching element 414, which in practice is an nMOS transistor, returns to a low potential (e.g. ground). This causes a voltage drop at the photo sensing node 416 as a result of the known feed through effect discussed hereinabove. This voltage drop can be observed on the $V_{PHOTO}$ waveform as a decrease in potential by the amount of $V_{FT}$ following the high to low transition of the RESET signal.

The function of the sample and hold circuit 420 and clamping circuit 460 is to difference the voltage level at the photo sensing node following the integration phase and the voltage level after reset and the feed through effect, in order to determine the intensity of light which was incident on the pixel circuit during integration. This amounts to a correlated double sampling operation.

The control signal CLAMP is turned "on" during the integration phase to "auto-zero" the clamping circuit amplifier 440. Turning on the CLAMP signal provides a straight feedback connection to the amplifier 440, removing influence of the capacitor 446. This causes the output $V_{OUT}$ of the clamping circuit to drop to the reference voltage input level $V_{REF}$. Whilst the CLAMP signal is on the control signal SAMP is also turned "on", near the end of the integration phase. With the SAMP signal "on" the source follower transistor 428 is connected in the feedback loop of the amplifier 418, and the capacitor 427 charges to the output voltage of the amplifier 418. The output of the source follower circuit is arranged to follow the voltage level at the photo sensing node ($V_{PHOTO}$).

The timing of the SAMP, CLAMP and RESET signals shown in FIG. 5 is arranged to also capture the feed through effect which occurs at the transistor switch 422 of the sample and hold circuit. In order to achieve that, the SAMP signal is turned "off" at the end of the integration phase when the photo sensing node voltage has reached its final value. This results in a $V_{FT}$ voltage drop which is reflected in the output of the source follower. Then, before the RESET signal is turned "on", the control signal CLAMP is turned "off". With the switching element 444 open the output of the clamping circuit 460 ($V_{OUT}$) reacts to the voltage at the source follower output (node 450) in proportion to the ratio of capacitors $C_1$ and $C_2$, starting from a baseline of the reference voltage $V_{REF}$. In particular, the output voltage can be expressed as $V_{OUT}=V_{REF}-(C_1/C_2) \cdot V_{450}$, where $V_{450}$ represents the voltage at node 450. The SAMP signal is therefore turned "on" again, which allows the clamping circuit output $V_{OUT}$ to follow any voltage changes which occur at the photo sensing node 416.

Shortly after the end of the integration phase the RESET signal is activated to reset the pixel circuit for the next image acquisition cycle. This causes a jump in the voltage at node 416 from the integrated voltage level to the reset voltage level $V_{RD}$, and a corresponding proportional rise in the voltage across capacitor 427 and at output $V_{OUT}$. Then, after the RESET signal is turned off, there is a feed through effect at transistor 414 which results in a voltage drop at the photo sensing nose 416. Once again, a corresponding voltage drop occurs across the capacitor 427 and at output $V_{OUT}$. Before the photo sensing node voltage significantly changes due to the next integration phase, the SAMP signal is turned "off", and another feed through effect voltage drop occurs due to switch 422. At this time the photo sensing node 416 is ready for the next integration phase and the voltage level thereat is $V_{RD}$ less the feed through effect voltage drops of switches 414 and 422, which is the voltage required for accurate measurement of an integration voltage drop at the photo sensing node. By this time the output voltage $V_{OUT}$ has risen from the reference voltage $V_{REF}$ by an amount corresponding to the integration voltage drop at the photo sensing node for the previous integration phase. The previous voltage level is held by the capacitor 427, however, and the output $V_{OUT}$ is therefore also held suitable for processing by analog to digital conversion or the like. Once the SAMP signal is turned "off" the next integration phase can begin at the pixel circuit without affecting the output signal $V_{OUT}$.

Referring particularly to FIG. 5, the value $V_{diff}$ is the quantity which is desired to be measured, corresponding to the difference in potential at the photo sensing node before and after light integration. The value $V_{diff}$ is not affected by the feed through effect voltage drops through the reset transistor and transistor switch 422. The actual output produced by the clamping circuit at the end of sampling measurement is $V_{OUT}=V_{REF}-V_{diff}*(C_1/C_2)$, as illustrated in FIG. 5. Because the quantities $V_{REF}$ and $(C_1/C_2)$ are known constants, the output $V_{OUT}$ provides the measurement desired of the correlated double sampling.

The timing diagram of FIG. 5 indicates several time instants $t_0, t_1, \ldots, t_5$, which are referred to below in a summary of the operations of the above described circuit and control signals:

$t_0$: With the CLAMP signal "on" 460 is in auto-zero mode. SAMP is "on" so that $V_{450}$ follows $V_{416}$, which is the integrated signal voltage.

$t_1$: SAMP is turned "off" so that $V_{450}$ is the integrated signal voltage plus any feed through from device 422.

$t_2$: CLAMP is then turned "off" so that the feed through effect is captured in the auto-zero of 460.

$t_3$: RESET is initiated and SAMP is turned back "on".

$t_4$: RESET is turned "off" resulting in a $V_{FT}$ drop at 416 and thus at 450 due to the feed through of 414.

$t_5$: SAMP is turned "off" to capture the reference black level plus the feed through of 422.

It will be noted that the structure of the functional circuit shown in FIG. 4 provides several advantageous effects. One of the advantages is a greater degree of linearity of performance compared to the prior art circuit discussed above. This is due to the use of the amplifier circuit 418 in place of a source follower which has inherently non-linear characteristics. Although a source follower transistor is used in the circuit 400 (component 428), it is placed within the feedback loop of the (preferably high gain) amplifier 418, which correspondingly reduces the non-linear influences. The amplifier circuit 418 which is coupled to the photo sensing node has greater linearity of operation, which is advantageous, and can be constructed in such a way as to not significantly increase the area required for the pixel circuit, as is described more clearly below with reference to FIG. 6. Furthermore, the image sensing and sampling circuit 400 allows the feed through effect of the reset transistor in the pixel circuit to be taken account of such that variations in the feed through voltage drop which may occur from one pixel circuit to another in a pixel array will not result in fixed pattern noise as in the prior art.

This latter advantage is achieved by the way in which the circuit 400 is arranged to sample the voltage at the photo sensing node using correlated double sampling. The light integrated photo sensing node voltage value is "sampled" first, on the high to low transition of the CLAMP control signal with the SAMP signal high. The second "sample" occurs at the high to low transition of the SAMP control signal, which is timed to correspond to a period following the reset phase but before light integration of the next cycle. Thus, this sample is taken after the reset transistor feed through effect has occurred. The sampling and clamping circuitry effectively measures the change in voltage of the photo sensing node which occurs between turning the CLAMP signal "off" and turning the SAAP signal "off". The capacitor 426 stores the voltage change value after the SAMP signal is "off".

Figure 6:
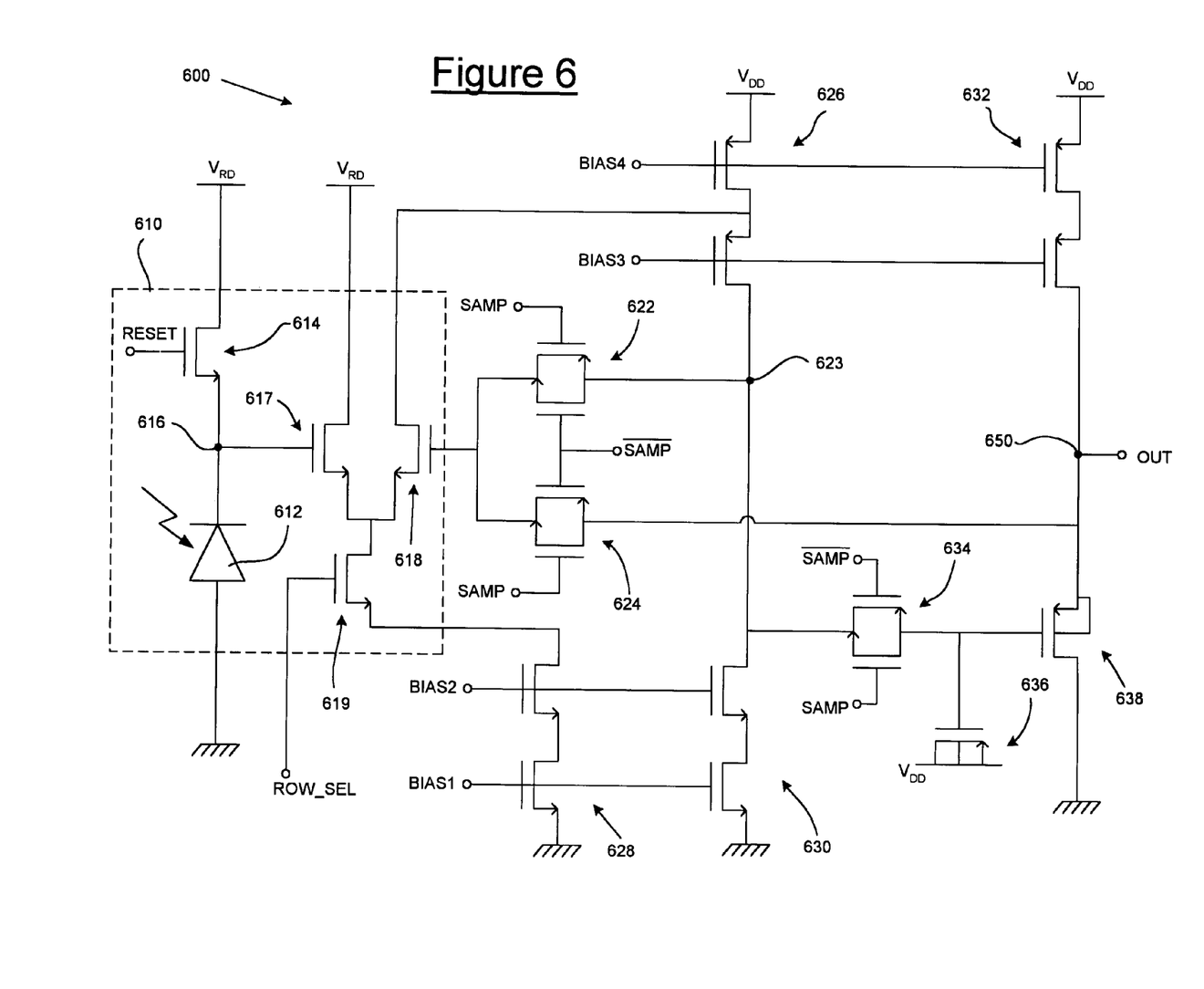
FIG. 6 is a detailed circuit diagram of the preferred embodiment of the present invention.

A CMOS circuit 600 is illustrated in FIG. 6 which is an example of a practical circuit for implementation of the functional circuit 400 shown in FIG. 4 and described above. The circuit 600 corresponds in function to the circuit 400, however the clamping circuit portion 460 of FIG. 4 is not shown in the circuit of FIG. 6. Of course a suitable structure for the clamping circuit portion 460 could be easily devised by a person of ordinary skill in the art.

A pixel circuit 610 comprising part of the circuit 600 is indicated in FIG. 6, including an nMOS reset transistor 614 and photo diode 612. The reset transistor and photo diode are coupled to a photo sensing node 616 in similar fashion to the pixel circuits already described herein. The photo sensing node 616 is also connected at the gate of a transistor 617 forming part of a differential input transistor pair 617 and 618. The nMOS transistor 617 has its drain coupled to a supply voltage $V_{RD}$ and its source coupled to the drain of a row select transistor 619. The row select transistor 619 is controlled by an input control signal ROW_SEL. A second of the differential input paired transistors 618, of nMOS construction, also has its source coupled to the drain of the row select transistor. Collectively the components consisting of transistors 614, 617, 618 and 619, and photo diode 612 comprise a pixel circuit as may be replicated adjacent one another in two dimensions to form an image sensing array of the type described in relation to FIG. 1. The remainder of the circuit 600 may conveniently be located at the bottom of a column of pixel circuits in an array, for example, and shared by the individual pixel circuits in the column as controlled by the state of the ROW_SEL input to each pixel circuit.

Several cascode transistor pairs forming current source loads are included in the circuit 600. One such cascode pair, 628, forms a negative current source load for the differential input transistor pair 617, 618, and is coupled between the source of the row select transistor 619 and ground. The cascode transistors pair 628 are controlled by respective inputs BIAS1 and BIAS2 provided to the gates thereof. Another cascode pair of nMOS transistors 630, similarly controlled by signals BIAS1 and BIAS2, are coupled between a node 623 and ground and are provided as a negative current source load for the output stage of the differential input transistor circuit. The node 623 corresponds to the output of the amplifier 418 of circuit 400. Also coupled to node 623 is a pMOS cascode transistor pair 626, which forms a positive current source load for both the input and output stages of the differential amplifier circuit. The cascode transistor pair 626 are controlled by respective inputs BIAS3 and BIAS4 provided to the gates thereof. Connected intermediate of the two transistors in the pair 626 is the drain of the second differential pair transistor 618.

A pMOS and nMOS transistor pair 622 are connected to one another in the form of a pass gate switching element coupled between the node 623 and the gate of the second amplifier transistor 618. The pass gate 622 is equivalent to the switching element 422 of the circuit 400, and is controlled at the pMOS transistor gate terminal by the SAMP signal and at the nMOS gate terminal by an inverse of the SAMP signal. Another pass gate pMOS and nMOS transistor pair 634 is coupled between the node 623 and the gate terminal of a pMOS source follower transistor 638. The pass gate transistor pair 634 corresponds to the switching element 422 of the circuit 400. The pass gate 634 is controlled at the nMOS gate terminal by the SAMP signal and at the pMOS gate terminal by the inverse SAMP signal.

The transistor 638 corresponds to the source follower 428 of circuit 400, and has its source terminal coupled to a node 650 which corresponds to the output node 450 of circuit 400. Another cascode transistor pair 632 is coupled between the output node 650 and the supply voltage $V_{DD}$. The transistors of the cascode pair 632 are controlled by the respective inputs BIAS3 and BIAS4. The transistor pair 632 correspond to the current source 429 in the circuit 400 of FIG. 4.

A final pass gate transistor pair 624 is connected between the output node 650 and the gate terminal of the second amplifier transistor 618. This pass gate transistor pair corresponds to the switching element 424 of circuit 400 and is controlled at the nMOS gate terminal by the SAMP signal and at the pMOS gate terminal by the inverse SAMP signal.

The circuit 600 is completed by a MOS capacitor 636 which is coupled to the junction of pass transistor pair 634 with the gate terminal of source follower 638. The MOS capacitor 636 performs the function of the capacitor storage element 426 in circuit 400 (i.e. the "hold" portion of the sample and hold operation).

From the description already given of the functional circuit 400 and the correspondence indicated between the components in FIG. 4 and FIG. 6, the operation of the circuit 600 will be readily apparent to those skilled in the art, and will not be reiterated here in the interests of succinctness.

The advantageous effects will, however, be briefly repeated in the context of the circuit 600. As will now be appreciated, the high gain amplifier circuit with feedback loop which the circuit 600 employs to sense voltage at the photo sensing node of the pixel circuit enables greater linearity of operation than the source follower sensing circuit of the prior art. The pMOS source follower which is employed in the circuit 600 is within the feedback gain loop of the amplifier circuit, and thus the non-linearity thereof is reduced by the gain of the sensing amplifier.

A particular advance provided by the preferred embodiment of the present invention is the cancellation of the influence of the feed through effect of the reset transistor in the CMOS pixel circuit. This is achieved by the use of a sample and hold circuit, which is also constructed within the feedback loop of the sensing amplifier. The sample and hold circuit, involving pass gate switching elements 622, 624 and 634 and MOS capacitor 636 allows the light integrated voltage from the pixel photo sensing node to be held until after the next reset phase so that the second sample of the CDS can be taken after the feed through effect of the reset transistor has taken place. This facilitates avoidance of a source of fixed pattern noise which has in the past degraded the image quality of CMOS image sensors.

Figure 7:
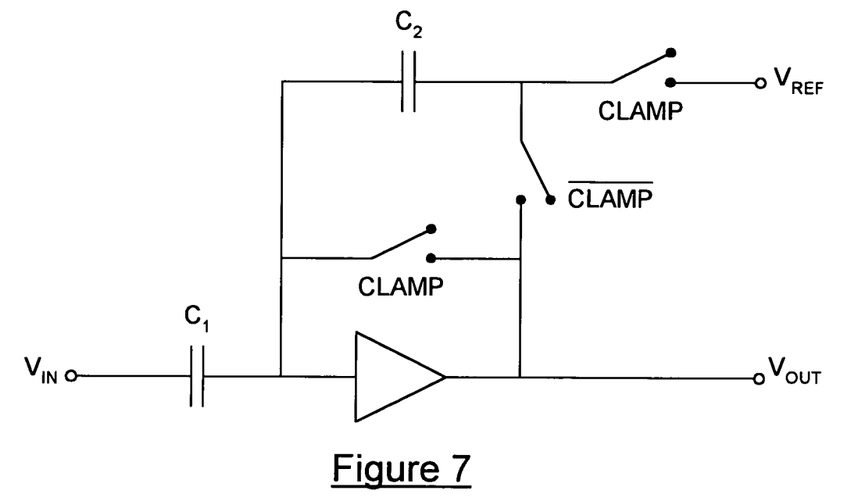
FIG. 7 is a block diagram of a single-ended clamp circuit for use in another embodiment of the invention.
Figure 8:
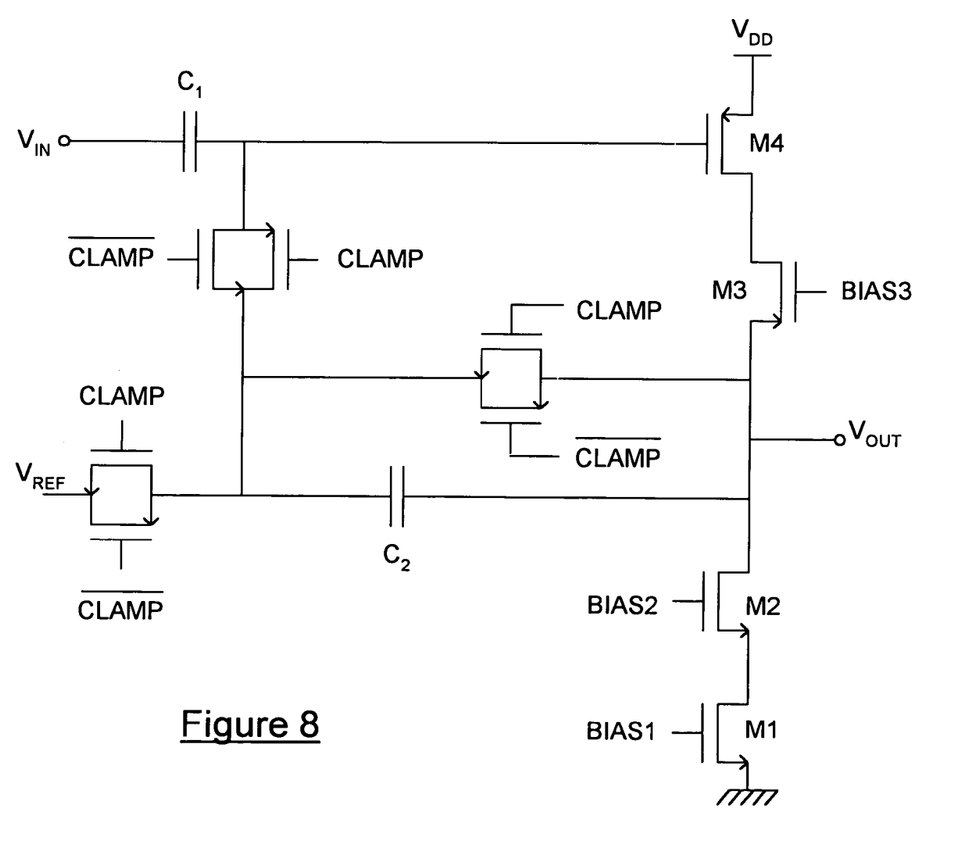
FIG. 8 is a schematic diagram of the single-ended clamp circuit of FIG. 7.

Whilst the clamp circuit amplifier 440 in FIG. 4 and the corresponding structure in FIG. 6 is a differential amplifier, alternative structures may also be used in accordance with the present invention. The differential amplifier accomplishes the clamping function, however a single-ended implementation can also perform the required functions. FIG. 7 is a block diagram of a single-ended clamp circuit which may be utilized in performing the present invention. FIG. 8 is a schematic circuit diagram of the single-ended clamp circuit. The single-ended clamping circuit is functionally the same as that shown in FIG. 4 and described hereinabove, and thus the description will not be repeated and the operation of the circuit will be apparent to those of ordinary skill in the art. One subtle difference is that the input voltage at the gate of the transistor labeled M1 in FIG. 8 is referenced to $V_{DD}$ in the single-ended design. This is the reason that a p-type MOS capacitor (rather than n-type) is used for the hold device 636 in FIG. 6. The bottom plate of the pMOS capacitor is held at $V_{DD}$ so any $V_{DD}$ variation occurs at both terminals of $C_1$ (FIG. 4) resulting in good power-supply noise rejection.

It will be recognized that it is possible to implement the feed through effect cancellation feature of the present invention using different voltage sensing circuits than the amplifier circuit which is described herein in connection with the preferred embodiment. Many different sensing circuits could alternatively be used, and indeed it is feasible to use the simple source follower sensing circuit of the prior art in conjunction with the feed through effect cancellation sample and hold structure if that were desired. Of course using the simple source follower sensing structure would mean that the additional quality benefits of the high gain sensing amplifier are not obtained. It is also possible to derive some benefits of the present invention without the use of the sample and hold circuit. By using an auto-zero style differencing circuit for correlated double sampling in conjunction with a high-gain pixel loop, the major sources of non-linearity observed in the prior art can be eliminated; namely the source followers used as buffers in both the pixel and CDS circuits.

Figure 9:
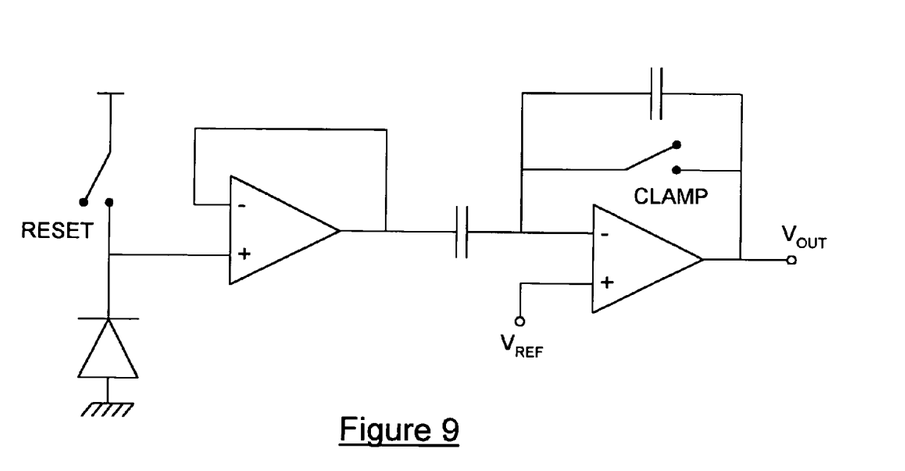
FIG. 9 is a functional block diagram of a sampling circuit without sample and hold function.
Figure 10:
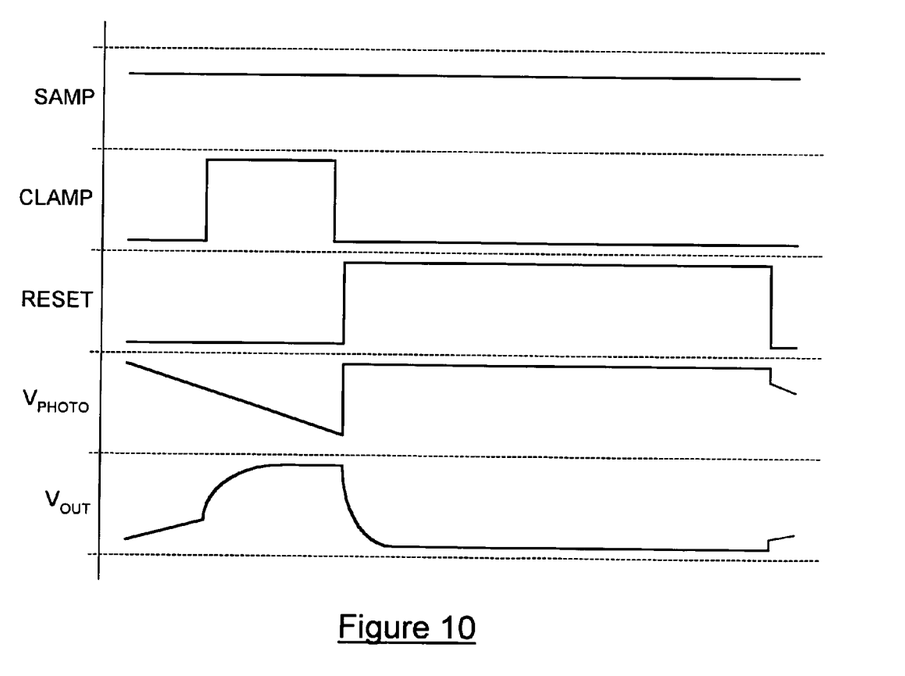
FIG. 10 is a voltage waveform timing diagram relating to operation of an embodiment of the present invention with disabled sample and hold function.

Considering the embodiment of the invention shown in FIG. 4 and described above, it is possible to operate the circuit in a way which disables the sample and hold block (420 in FIG. 4). This requires holding SAMP on at all times and holding RESET on throughout the time that the clamp circuit output is used by other circuits (i.e. A/D). A functional circuit diagram of the sampling circuit with the sample and hold disabled is shown in FIG. 9, accompanied by a voltage waveform timing diagram in FIG. 10 which illustrates the circuit operation.

From the foregoing description it will also be appreciated that, although circuitry constructed according to the principles of the present invention provide significant performance enhancements compared to the prior art, in the preferred embodiment the additional circuitry need not significantly increase the silicon area required by individual pixel circuits. The size of a pixel circuit can be an important consideration, particularly where image sensing arrays of approaching or exceeding millions of pixel circuits on a single chip are contemplated. As explained above with reference to FIG. 4 and FIG. 6, most of the voltage sensing and double correlated sampling circuitry does not need to be physically located within a pixel circuit cell, and can be shared by a column of pixel circuits. As can be readily ascertained from a comparison of the prior art pixel circuit 210 of FIG. 2 and the pixel circuit 610 of FIG. 6, the circuit of the preferred embodiment of the present invention has only one more transistor in the pixel circuit than the prior art pixel circuit.

The image sensing and sampling circuit according to embodiments of the present invention can operate with or without the additional use of a mechanical shutter to control light exposure. Without a mechanical shutter, integration begins immediately after the reset transistor (e.g. 414 in FIG. 4) is turned "off". Therefore, without a mechanical shutter, the end of the reset phase defines the beginning of integration. Integration is a relatively slow process, whereby the voltage changes relatively slowly over time. So as long as the second CDS sample is taken very soon after the reset phase, very little integration will have occurred. Furthermore, although in the foregoing description the second CDS sample is referred to as being taken at the beginning of the following integration phase, that method of operation is not essential. For example, the following integration phase does not necessarily have to begin immediately after the end of the previous integration phase. The reset phase can be re-initiated after the SAMP signal has been turned off and the pixel can remain in the reset phase for as long as desired.

The foregoing detailed description of the present invention has been presented by way of example only, and it is contemplated that changes and modifications may be made by one of ordinary skill in the art, to the materials and arrangements of elements of the present invention without departing from the scope of the invention. For example, the CMOS image sensor circuit embodiments described herein are in the context of an N-Well CMOS Process Technology and utilize a photo diode sensor as a light sensing element. However, many variations of known technologies can be used to implement the CMOS image sensing and sampling circuits of the present invention. For example, a different process technology may be used to fabricate the CMOS image sensor circuits. Examples of other process technologies that may be used include nMOS, pMOS DRAM or Embedded DRAM, and P-Well CMOS Process Technology. Furthermore, the photo sensor can be implemented with a photo diode or photo-gate sensor. Also, as previously set forth, various different amplifier gain values may be used as appropriate.

We claim:

1. A sampling circuit for an image sensing circuit having a photosensitive element which develops a photo sensing node voltage according to incident light, the sampling circuit comprising:
    an amplifier circuit having an output and having a differential input transistor pair circuit with said photo sensing node voltage as a first input and with a feedback signal as a second input; and
    a sample and hold circuit having an input coupled to the output of the amplifier circuit, and having an output; and a clamping circuit coupled to the output of the sample and hold circuit and having an output carrying a signal representing a double correlated sample voltage difference at said photo sensing node;
    wherein the feedback signal is received by the second input of the amplifier circuit from the output of the sample and hold.

2. A sampling circuit as claimed in claim 1, wherein a source follower circuit coupled within said feedback loop is used to couple the output of the sample and hold circuit to said clamping circuit.

3. A sampling circuit as claimed in claim 2, wherein said clamping circuit comprises an auto-zero amplifier circuit having a feedback loop which includes a first capacitive storage element coupled in parallel with a switching element controlled by a clamp signal.

4. A sampling circuit as claimed in claim 2, wherein the feedback loop is arranged so that the amplifier circuit has a gain of greater than unity.

5. A sampling circuit as claimed in claim 1, wherein a plurality of image sensing circuits are arranged in an array, each forming a pixel circuit of an image sensor, and wherein each pixel circuit includes a said photo sensitive element, a reset switching element and a said differential input transistor pair as part of said amplifier circuit, and wherein the sample and hold circuit and the clamping circuit are shared by a plurality of pixel circuits in the image sensor array.

6. A sampling circuit as claimed in claim 1, wherein the image sensing circuit, amplifier circuit, sample and hold circuit and clamping circuit are constructed in the same integrated circuit using CMOS fabrication technology.

7. A sampling circuit for an image sensing circuit having a photosensitive element which develops a photo sensing node voltage according to incident light, the sampling circuit comprising:
 an amplifier circuit having a differential input transistor pair circuit with said photo sensing node voltage as one input;
 a sample and hold circuit coupled to an output of the amplifier circuit; and
 a clamping circuit coupled to an output of the sample and hold circuit and produce an output signal representing a double correlated sample voltage difference at said photo sensing node;
 wherein the amplifier circuit is coupled to the output of the sample and hold circuit as a second input, to form a feedback loop;
 wherein a source follower circuit coupled within said feedback loop is used to couple the output of the sample and hold circuit to said clamping circuit;
 wherein said clamping circuit comprises an auto-zero amplifier circuit having a feedback loop which includes a first capacitive storage element coupled in parallel with a switching element controlled by a clamp signal; and
 wherein the amplifier circuit of the clamping circuit has a first input coupled to a reference voltage and a second input coupled by way of a second capacitive element to said sample and hold circuit output, and wherein said clamping circuit is controlled by said clamp signal such that in a first state the output of the clamping circuit amplifier is fixed by said reference voltage and in a second state the clamping circuit output changes in accordance with said sample and hold circuit output from a baseline of the fixed reference voltage output.

8. An image sensor circuit having a two dimensional array of light sensitive pixel circuits, each pixel circuit comprising a photosensitive element and a reset switching element coupled to a light sensing node, a differential input transistor pair having a first input thereof coupled to said light sensing node, and an enable switching element coupled to selectively block output from the differential input transistor pair, the image sensing circuit further comprising sampling circuitry for producing output signals corresponding to light incident on each of the respective pixel circuits,
 wherein said sampling circuitry provides a feedback path defined from the output of the differential input transistor pair to a second input of said differential input transistor pair of each of said pixel circuits, and
 wherein said sampling circuitry includes a sample and hold circuit within the feedback path having an input coupled to receive a signal from the output from the differential input transistor pair and sample the received signal, and having an output coupled to transfer the sampled signal to the second input of said differential input transistor pair.

9. An image sensor circuit as claimed in claim 8, wherein said sampling circuitry further includes a source follower circuit coupled within said feedback path which provides an input to a clamping circuit.

10. An image sensor circuit as claimed in claim 9, wherein said clamping circuit comprises an auto-zero amplifier circuit.

11. An image sensor circuit as claimed in claim 8, wherein the image sensor array is implemented with CMOS technology.

12. An image sensor array as claimed in claim 8, wherein the photosensitive element comprises a photo-diode.

13. An image sensor array as claimed in claim 8, wherein the photosensitive element comprises a photo-gate transistor.

14. An image sensor circuit having a two dimensional array of light sensitive pixel circuits, each pixel circuit comprising a photosensitive element and a reset switching element coupled to a light sensing node, a differential input transistor pair having a first input thereof coupled to said light sensing node, and an enable switching element coupled to selectively block output from the differential input transistor pair, the image sensing circuit further comprising sampling circuitry for producing output signals corresponding to light incident on each of the respective pixel circuits;
 wherein said sampling circuitry provides a feedback path to a second input of said differential input transistor pair of each of said pixel circuits;
wherein said sampling circuitry includes a sample and hold circuit coupled within said feedback path;
 wherein said sampling circuitry further includes a source follower circuit coupled within said feedback path which provides an input to a clamping circuit; and
 wherein said clamping circuit comprises an auto-zero amplifier circuit having a feedback loop which includes a first capacitive storage element coupled in parallel with a switching element controlled by a clamp signal, and wherein the auto-zero amplifier circuit of the clamping circuit has a first input coupled to a reference voltage and a second input coupled by way of a second capacitive element to an output of said sample and hold circuit, and wherein said clamping circuit is controllable by said clamp signal such that in a first state the output of the clamping circuit auto-zero amplifier is fixed by said reference voltage and in a second state the clamping circuit output changes in accordance with the input received from said sample and hold circuit from a baseline of said fixed reference voltage output.

15. In an image sensor circuit having an array of pixels including light sensing nodes at each of which a change in voltage can be imparted by exposure to a light source, a method for obtaining output signals representing the voltage changes at the light sensing nodes in order to obtain image data, comprising:
 at each said pixel providing a differential amplifier circuit with an input driven by the voltage on the respective light sensing node to produce an amplifier output;
providing a sample and hold circuit with an input coupled to selectively receive the amplifier output of a said pixel amplifier circuit in the array, the sample and hold circuit being controlled by a first control signal input and producing an output signal;

coupling the sample and hold circuit output to a second input of the differential amplifier within a feedback loop;

providing a clamping circuit coupled to the sample and hold circuit output, the clamping circuit producing an output according to the received sample and hold signal output and a second control signal; and controlling the first and second control signals to the sample and hold circuit and the clamping circuit respectively so as to perform correlated double sampling of the voltage at the respective light sensing node so as to obtain a representation of the change of voltage thereat imparted substantially only by exposure to light.

16. A sampling circuit for an image sensing circuit having a photosensitive element which develops a photo sensing node voltage according to incident light, the sampling circuit comprising:

a feedback loop amplifier circuit having said photo sensing node voltage as one input and producing an output, and a sample and hold circuit having an input coupled to receive the amplifier circuit output and the sample and hold circuit having an output coupled to transfer a sampled value to a second input of the feedback loop amplifier circuit, to form a feedback path containing the sample and hold circuit in feedback path;

a clamping circuit coupled to the output from the sample and hold circuit and which produces an output signal representing a double correlated sample voltage difference at said photo sensing node.

17. A sampling circuit as claimed in claim 16, wherein the amplifier circuit includes a source follower circuit coupled within the feedback loop thereof, the source follower circuit supplying output to the clamping circuit.

18. A sampling circuit as claimed in claim 17, wherein the feedback of said feedback loop amplifier is arranged so that the amplifier circuit has a gain of greater than unity.

19. A sampling circuit as claimed in claim 16, wherein said clamping circuit comprises an auto-zero amplifier circuit.

20. A sampling circuit as claimed in claim 19, wherein the auto-zero amplifier circuit has a feedback loop which includes a first capacitive storage element coupled in parallel with a switching element controlled by a clamp signal.

21. A sampling circuit for an image sensing circuit having a photosensitive element which develops a photo sensing node voltage according to incident light, the sampling circuit comprising:

a feedback loop amplifier circuit having said photo sensing node voltage as an input; and a clamping circuit coupled to an output from the feedback loop amplifier circuit and produce an output signal representing a double correlated sample voltage difference at said photo sensing node;

wherein said clamping circuit comprises an auto-zero amplifier circuit;

wherein the auto-zero amplifier circuit has a feedback loop which includes a first capacitive storage element coupled in parallel with a switching element controlled by a clamp signal; and wherein the amplifier circuit of the clamping circuit has a first input coupled to a reference voltage and a second input coupled by way of a second capacitive element to said output from the feedback loop amplifier, and wherein said clamping circuit is controlled by a clamp signal such that in a first state the output of the clamping circuit amplifier is fixed by said reference voltage and in a second state the clamping circuit output changes in accordance with said feedback loop amplifier output from a baseline of the fixed reference voltage output.

* * * * *

UNITED STATES PATENT AND TRADEMARK OFFICE
CERTIFICATE OF CORRECTION

| | |
|---|---|
| PATENT NO. | : 7,133,074 B1 |
| APPLICATION NO. | : 09/406979 |
| DATED | : November 7, 2006 |
| INVENTOR(S) | : Kevin Brehmer et al. |

It is certified that error appears in the above-identified patent and that said Letters Patent is hereby corrected as shown below:

Column 5, line 16, the equation should read --"($V_{RB} = V_{RD}\textbf{-}V_{\textbf{FT}}$)".
Column 11, line 16, "SAAP" should read -- SAMP --.

Signed and Sealed this

Thirtieth Day of January, 2007

JON W. DUDAS
*Director of the United States Patent and Trademark Office*